Nov. 28, 1944.　　F. V. BROWN　　2,363,479
REMOTE CONTROL SYSTEM
Filed Jan. 12, 1943　　6 Sheets-Sheet 1

Nov. 28, 1944.  F. V. BROWN  2,363,479
REMOTE CONTROL SYSTEM
Filed Jan. 12, 1943  6 Sheets—Sheet 6

Inventor
Francis V. Brown
by Sommers & Young
Attorneys

Patented Nov. 28, 1944

2,363,479

UNITED STATES PATENT OFFICE 2,363,479

REMOTE CONTROL SYSTEM

Francis Victor Brown, Birmingham, England

Application January 12, 1943, Serial No. 472,120
In Great Britain January 22, 1942

10 Claims. (Cl. 60—54.5)

This invention relates to remote control systems wherein either a hydraulic or a mechanical transmission is used between the master control and the sub-control unit sometimes called a motor or receiver unit.

In the specification belonging to my United States Patent No. 2,308,048, dated January 12, 1943, I have described and claimed a remote control system wherein variations in volume or length of the transmission medium or means are compensated by the aid of a mechanical linkage comprising eccentrics of oppositely disposed eccentricity around a common centre having their straps coupled with a device constrained to move in one direction only, the said eccentrics being normally free to adjust themselves revolubly, simultaneously under the influence of the said variations but constituting with their straps a locked mechanism when the transmission is operatively stressed. In mechanisms of this kind and with the eccentric straps having a pivotal connection with a crosshead guided for rectilinear movement, errors can develop arising from the condition of clearance between the eccentric and eccentric strap, essential to free rotation of the eccentric within the strap. In effect on each occasion the mechanism might be operatively stressed the more heavily loaded eccentric strap in the process of binding on to its mating eccentric squeezed the clearance to one side swinging very slightly relative to the crosshead during the squeezing action. The error can develop in a cumulative manner in consequence of successive slight movements of the kind referred to. It is one of the objects of the present invention to provide an improved eccentric mechanism which is adapted for use in apparatus wherein a high degree of accuracy is demanded, and which is so contrived as to prevent possibility of the cumulative error referred to.

Furthermore, in eccentric mechanisms of the kind referred to and when used in apparatus designed for a relatively great length of transmission or possessing a relatively high volumetric capacity, it is possible for the two eccentrics to perform their simultaneous but opposite revoluble movements, under the effect of either one continuous variation or successive variations, to such an extent as to bring their centres of eccentricity into coincidence. When this happens, it is not possible to cause the straps to bind upon them, when such straps are operated by a hand control lever. When this condition is reached, the straps would simply move idly around the eccentrics and fail to operate the control system unless suitable provision is made. It is a further object of the present invention, therefore, to devise means for dealing with this abnormal condition of the mechanism.

According to the present invention, a remote control system, wherein variations in volume or length of the transmission medium or means are compensated by the aid of a mechanical linkage comprising oppositely disposed eccentrics, is distinguished by the eccentrics having their strap devices formed as sliders movable in rectilineal guides, the said eccentrics being normally free to adjust themselves revolubly simultaneously under the influence of the said variations, during which revoluble adjustments the sliders move along their guides, but constituting with their strap devices or sliders a locked mechanism when the transmission is operatively stressed. In the case of a hand control lever being used in the system the guides are provided in a hub formation of such lever. Anti-friction bearings, such as roller bearings, are suitably provided between respective slides and eccentrics and such bearings may, if desired, be put under initial stress when the parts are assembled. Thus, when the eccentrics are turned simultaneously in opposite directions, due to the aforesaid variations and assuming that the control lever has a normally upwardly inclined position, one of the slides is moved upwards in its guide and the other is moved downwards in its guide. Upon the swinging over of the control lever at any time for the operation of the transmission, the sliders instantly bind between the guides and upon respective eccentrics and with no lag in the binding of the one as compared with that of the other.

During the normal operation of the mechanism it may be that the eccentrics will arrive in a position in which their eccentrics coincide, in which event the control lever would be swung and the sliders would be turned idly about the eccentrics. To avoid this, an automatic locking device is provided which causes the sliders to bind on the eccentrics when the control lever is swung with the eccentrics in the position of coincidence.

The application of the eccentric mechanism to pistons used as compensators only and not as part of a master control, will be hereinafter fully explained.

In order that the invention may be readily understood reference is made to the accompanying drawings, in which.

Figures 1, 2:
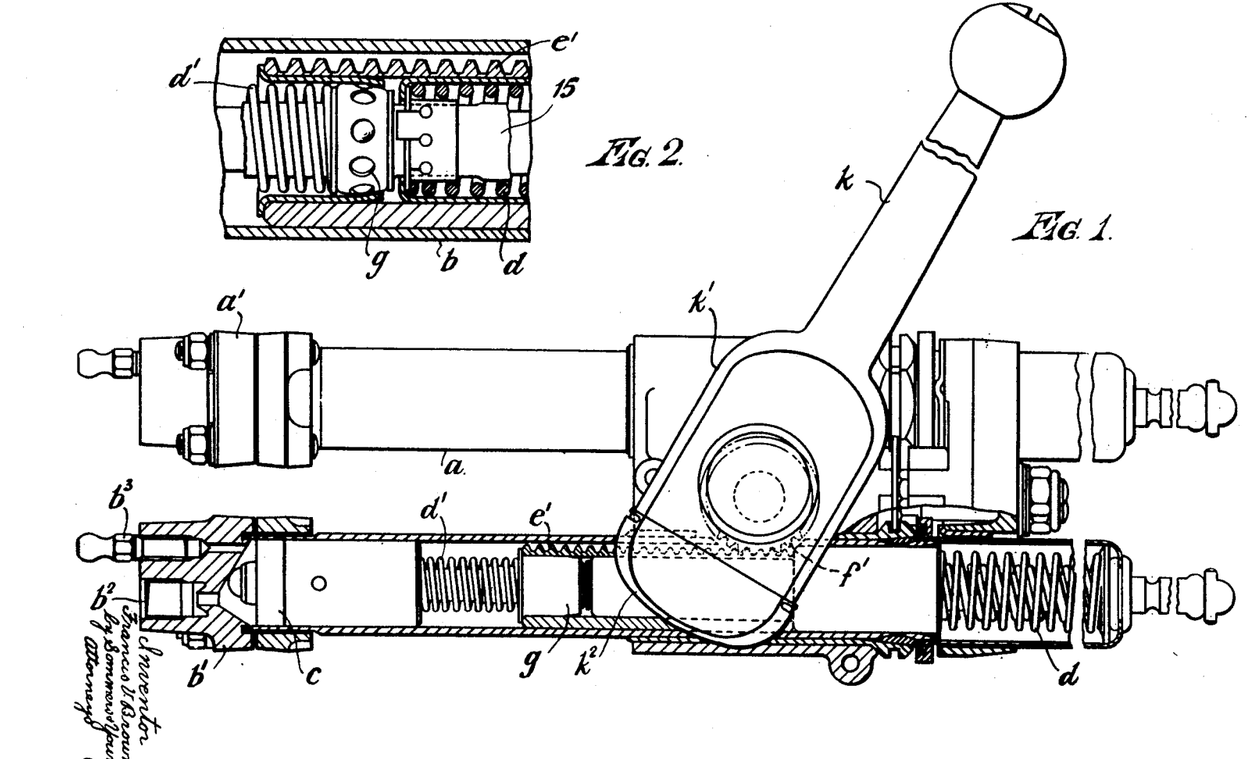
Figure 1 is partly a side elevation and partly a longitudinal section of a master control fitted with the present improvements and adapted for use on a hydraulic control system.
Figure 2 is a fragmental longitudinal section to a larger scale of parts seen in Figure 1.

Referring to Figure 1 of the drawings, $a$ and $b$ are two hydraulic cylinders alike in construction and operation, excepting that when the piston $c$ of one is at the end of its outward stroke, the piston of the other cylinder is at the end of its inward stroke. The cylinder $b$ is seen to be fitted on one end with a nozzle piece $b^1$ wherein is formed a screw-threaded socket $b^2$ for the tight jointing of a pipe leading to one end of the motor unit. The nozzle piece $b^1$ is also fitted with a screw plug $b^3$ normally closing a bleed hole, the latter being opened to permit escape of air when the system is charged with liquid. The cylinder $a$ is fitted with a similar nozzle piece $a^1$. Compression springs $d$ one within the other constantly tend to keep each piston $c$ at the end of its outward stroke. The piston $c$ of cylinder $b$ is shown beyond the end of its outward stroke because there is no pressure present to force it back and put its spring $d$ under further compression. Each piston is in operative connection with a cylindrical rack $e$ or $e^1$, see also Figure 4, which meshes with a respective pinion $f$ or $f^1$. The teeth of the rack $e^1$ in the cylinder $b$ are upwardly presented so as to mesh beneath the respective pinion $f^1$ whereas the teeth of the rack $e$ in the cylinder $a$ are downwardly presented so as to mesh on top of the respective pinion $f$. If expansion of the liquid in the hydraulic system should occur, the pistons $c$ in both cylinders $a$ and $b$ are forced rightwardly in Figure 1 against the action of their springs $d$. Owing to the meshing just explained each piston movement will drive the respective pinions in opposite directions. On the contrary, if contraction of the liquid should occur, the pistons $c$ are forced leftwardly by respective springs $d$ and the pinions are again driven oppositely to one another but in the reverse direction as compared with the direction of revolution when expansion occurred. If there should be a slight loss of liquid from either of the pipe lines, the piston in the cylinder affected follows up recession of the liquid under the urge of an auxiliary spring $d^1$ and is locked in its new position and prevented from being hydraulically pressed back into the old position by means of a one-way ball clutch device $g$ seen in detail in Figure 2. This clutch permits the rod of the piston to move leftwardly in relation to its rack $e$ or $e^1$ but prevents it from moving rightwardly in relation to such rack. When the liquid charge in a system is to be replenished, the pistons must be permitted to move back to a normal position under the pressure of the liquid. For this purpose a so-called lifter tube 15 is provided which when pushed in is able to release the ball clutch device. This lifter tube is of similar nature to that described in the specification of my U. S. Patent No. 2,308,048 and therefore needs no further description here.

Figure 3:
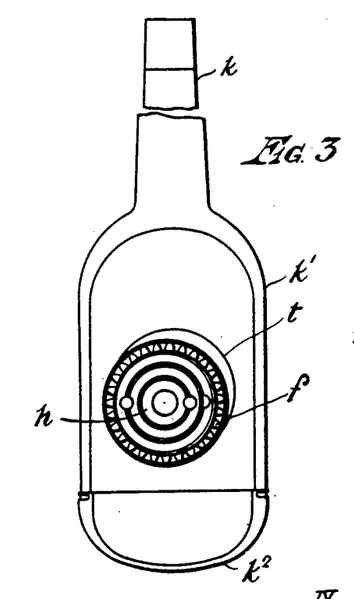
Figure 3 is a side elevation (as seen from the right hand side of Figure 4) of a hand control lever fitted with the eccentric devices of these improvements.
Figure 4:
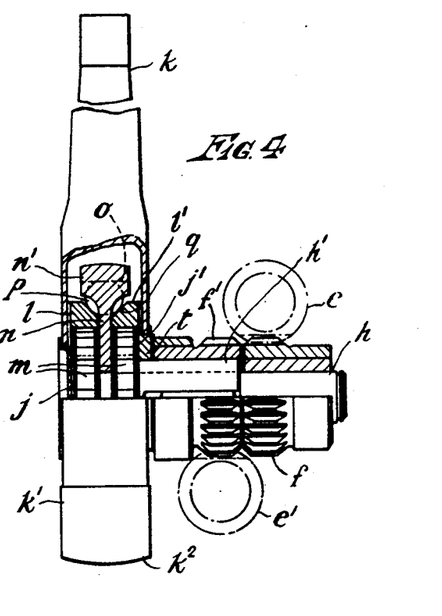
Figure 4 is a view as seen from the left hand of Figure 3 but with an external part broken away to disclose the mechanism within.

As will be seen clearly from Figures 3 and 4, the pinion $f$ is fixedly mounted on a shaft $h$ of an eccentric $j$ and the pinion $f^1$ is fixedly mounted on a hollow shaft $h^1$ of an eccentric $j^1$, the hollow shaft $h^1$ being revolubly sleeved on to the shaft $h$. Thus, equal and opposite movements of the pinions $f$ and $f^1$ will produce similar equal and opposite movements of the eccentrics $j$ and $j^1$. Normally, the eccentrics $j$ $j^1$, as viewed in end elevation have their eccentric radii directed oppositely but at the same angle from a neutral line. Thus, when viewing the mechanism in Figure 4 from the left-hand side, the eccentric $j$ may have its eccentric radius displaced counter-clockwise by a given angle from a neutral radius in which case the eccentric $j^1$ would normally have its eccentric radius displaced clockwise by a similar angle from the said neutral radius.

Figure 5:
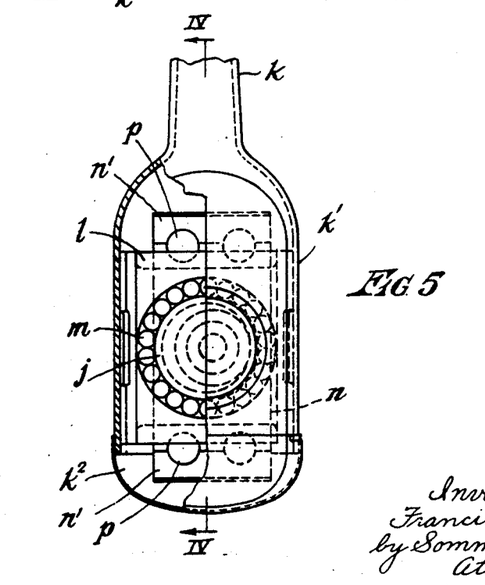
Figure 5 is similar to Figure 3 but as seen from the opposite side and with an external part broken away to disclose the mechanism within.
Figure 6:
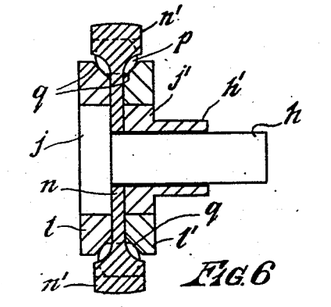
Figure 6 is a cross section of the eccentric mechanism of these improvements, the eccentrics having been turned so that their eccentricities coincide.
Figure 7:
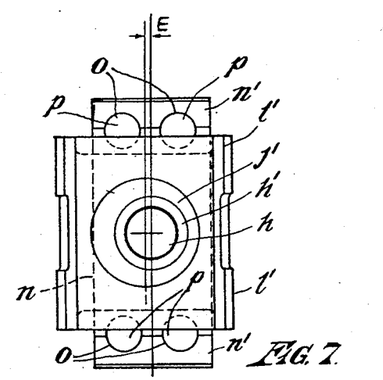
Figure 7 is an elevation as seen from the right hand side of Figure 6.

In the construction according to the present improvements, the so-called strap devices, in which the eccentrics $j$ $j^1$ are operatively engaged, are sliders $l$ $l^1$, Figures 4 and 5, guidingly mounted for rectilinear movement only in a hub or housing $k^1$ of the hand lever $k$. In the specification belonging to my prior aforesaid Patent No. 2,308,048, the strap devices were rings having lugs pivotally connected with a crosshead, the latter being carried by a stem having rectilineal guidance. In both mechanisms, however, the eccentrics are normally free to adjust themselves revolubly simultaneously under the influence of variations in volume or length of the transmission medium or means but constitute with their strap devices a locked mechanism when the transmission is operatively stressed. Thus, and as will be understood from Figures 4 and 5, if the eccentrics $j$ and $j^1$ are oppositely disposed as described above, they can freely be turned simultaneously in opposite directions and through equal angles by their pinions $f$ and $f^1$, such turning simply resulting in one slider $l$ or $l^1$ rising in its guides in the housing $k^1$ and in the other slider moving downwards in its guides. The mechanism is thus free to compensate for variations in the transmission as already explained. If the master control is to be operated, the hand lever $k$ is grasped and turned through an angle as for example, leftwardly from the position seen in Figure 1. Immediately such hand pressure comes upon the lever, the strap devices or sliders $l$ $l^1$ will bind between the guides and on respective eccentrics because of the tendency to turn them in one and the same direction about different centres. Such binding action is immediate and effectual for turning the shafts $h$ $h^1$, in view of the said strap devices being confined closely by the rectilineal guides in the housing $k^1$ and the sole possible relative movement of such devices being rectilineal in such guides.

In the example illustrated, and as will be clear from Figures 4 and 5, a ball or roller bearing $m$ may be interposed between each of the eccentrics and its strap device, so that the eccentrics $j$ $j^1$ may be turned easily by their pinions $f$ $f^1$ during the compensating movements above described. In order to avoid any slackness in these bearings, such as might introduce slight errors when the control is exercised, the said bearings $m$ may be put under initial stress when the parts are assembled.

Figure 10:
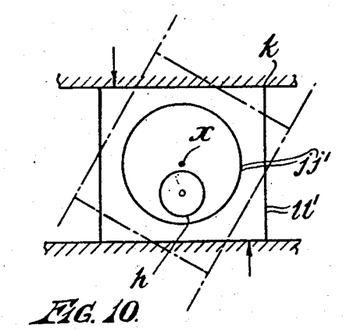
Figures 10 and 11 are diagrammatic views explaining the operation of the parts seen in Figures 6 to 9.

After a period of use, involving a number of similar compensatory movements by the eccentrics $j$ $j^1$, in which movements each turns through a small angle oppositely to the other, it may be that the eccentrics will arrive in a position in which their eccentricities coincide. This is assumed to be the case in Figure 10, from which it will be understood that if the control lever is then swung so as to exert through the housing $k^1$ a couple as indicated by the arrows, the two sliders $l$ $l^1$ would be idly turned about the eccentrics $j$ $j^1$ seeing that both are free to revolve about the common centre $x$. During such turning, the two sliders would be moved freely by their eccentrics in one and the same rectilineal direction in the guides. Thus, no torque would be transmitted to the shafts $h$ $h^1$. It will be apparent, however, that if the slides could be prevented from performing this rectilineal sliding movement during such turning, they would then bind upon the eccentrics, so that a torque would be imparted to the shafts $h$ $h^1$. These improvements therefore further provide an automatic locking device now to be described, for causing the sliders to bind on the eccentrics when the control lever is swung with the eccentrics in the position in which their radii of eccentricity coincide.

Figure 8:
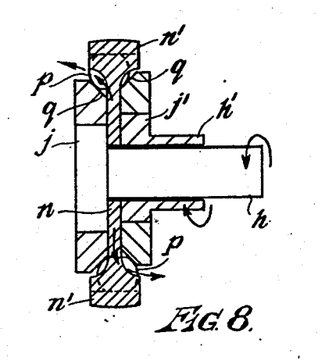
Figure 8 is a view similar to Figure 6 but showing the eccentrics after they have been turned a little in opposite directions from the position shown in Figures 6 and 7.
Figure 9:
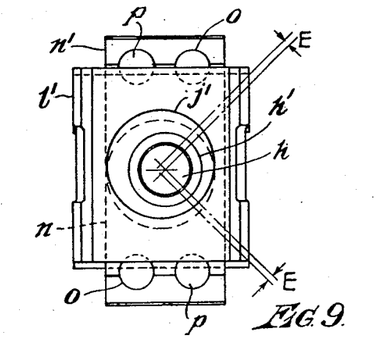
Figure 9 is an elevation as seen from the right hand side of Figure 8.

Referring to Figures 4 to 9, the automatic locking device comprises a plate $n$ disposed between the juxtaposed eccentric $j$ $j^1$ and their sliders $l$ $l^1$, this plate $n$ being revolubly fitted on the control shaft $h$. End portions $n^1$ of this plate extending beyond the ends of the sliders $l$ $l^1$ are thickened and such end portions are formed with transverse bores $o$ in which are slidingly received short cylindrical pins $p$ with rounded ends. The outer ends of the sliders $l$ $l^1$, at those edges which are adjacent to one another, are bevelled at $q$ at a suitable angle for engaging the rounded ends of the pins $p$ with a camming action. Whenever the eccentrics $j$ $j^1$ are turned simultaneously in opposite directions by their pinions $f$ $f^1$ one of the sliders $l$ $l^1$ is moved up in its guides and the other is moved down. The action at each end of the sliders is similar, for as one bevelled edge $q$ moves away from the rounded end of the pins $p$ at one side, see the top left-hand part of Figure 8, it leaves the pins $p$ free to move laterally under the camming action of the bevelled edge $q$ at the opposite side. Figure 8 represents the eccentrics when they have turned oppositely to one another so that their radii of eccentricity no longer coincide, as is indicated by the diagram lines in Figure 9. Comparing Figure 8 with Figure 6 which shows the eccentrics in the position in which their radii of eccentricity coincide, it will be seen that the pins $p$ at the top of the figure have been cammed leftwards and that the pins $p$ at the bottom of the figure have been cammed rightwards. The radii of throw of the eccentrics shown by E in Figure 9 is magnified for purposes of illustration in Figures 10 and 11 as will be understood.

Figure 11:
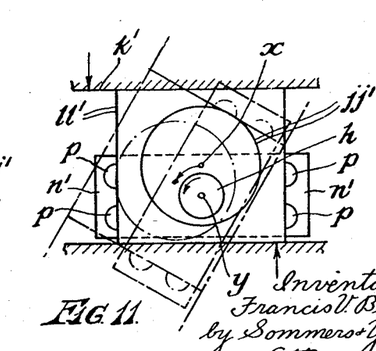

With the eccentrics $j$ $j^1$ not coincident and in a position such as is shown in Figure 8, any turning of the hand lever $k$ and housing $k^1$ will immediately cause the sliders $l$ $l^1$ to bind on the eccentrics as already explained. With the eccentrics in the coincident position shown in Figure 6, and if the plate $n$ and pins $p$ were not present, turning of the hand lever $k$, to exert the couple indicated by the arrows, would merely cause the sliders $l$ $l^1$ to turn idly around the eccentrics $j$ $j^1$ as has already been explained by reference to Figure 10. With the present invention, however, if the hand lever is turned with the eccentrics coinciding as in Figure 6, the tendency for the sliders $l$ $l^1$ to be moved by their eccentrics rectilinearly and simultaneously in the same direction is prevented by the pins $p$, because these pins are carried by the plate $n$, which is revoluble around the centre $y$ of the shaft $h$, see Figure 11, whereas the sliders $l$ $l^1$ if free to do so would turn about the centre $x$ as already explained. If in the turning movement, the tendency is for the two sliders $l$ $l^1$ to move simultaneously upwards in their guides in Figure 6, such movement is prevented by the pins $p$ at the top engaging between the sliders and the thickened top end of the plate $n$. Consequently, the locked sliders $l$ $l^1$ are constrained to turn about the shaft centre $y$, as indicated in Figure 11, and in so doing bind on the eccentrics $j$ $j^1$ and turn the latter so that a torque is imparted to the shafts $h$ $h^1$.

With the particular eccentric mechanism described in the specification of my Patent No. 2,308,048 aforesaid, it was necessary to re-set the eccentrics from time to time and particularly when their radii of eccentricity approached coincidence. With the improved mechanism just described, however, it is possible for the eccentrics to continue to revolve step by step simultaneously and in opposite directions for the compensation of variations, even after they have reached the position wherein their radii of eccentricity coincide. Having passed this position and re-attained positions of opposite eccentricity, as described with reference to Figure 8, the normal operation of the parts will be resumed during subsequent operations of the control lever $k$ and until the eccentrics again come into coincidence. The improved mechanism, therefore, is very suitable for installations wherein a considerable distance exists between the master control illustrated in the drawings and a distant motor unit controlled by it, so that a considerable total variation in the volume of the transmission medium, or in the length of the transmission means, must be catered for.

As will be clear from Figures 3 to 5, the hand control lever $k$ and its hub or housing $k^1$ may be made from a tube of metal by several operations which result in one end of the tube becoming enlarged and flattened into the form of the housing $k^1$ suitable for guiding the sliders $l\ l^1$ in the manner described. As seen best in Figure 5, the end portion $k^2$ of the housing may be separately formed as a removable cap. As seen in Figures 3 and 4, the lever $k$ may be pivotally supported by having one wall of its hub $k^1$ formed with a hole which is revolubly engaged with an eccentric bush $t$ surrounding the hollow shaft $h^1$.

Figure 12:
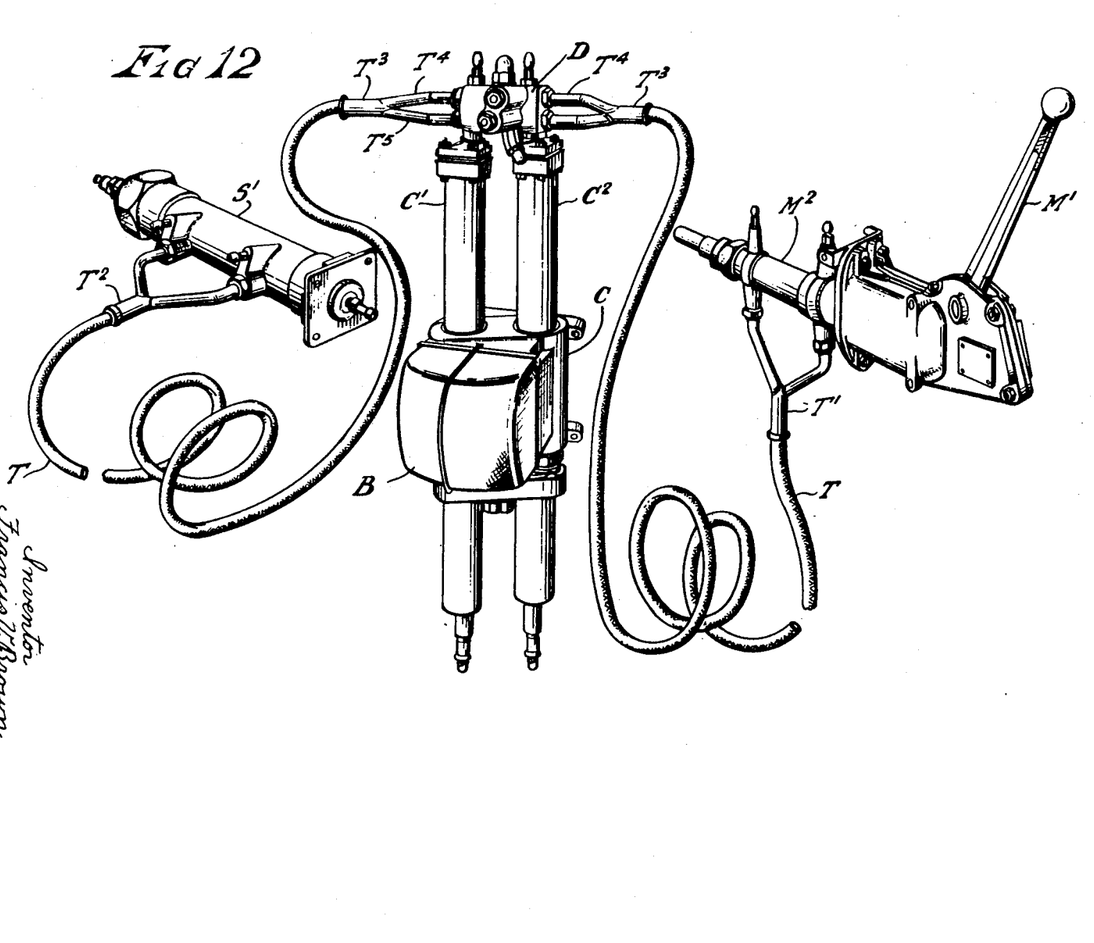
Figure 12 is a perspective view of a remote control hydraulic system incorporating a compensating mechanism to which the eccentric mechanism of these improvements is applied, instead of being applied to the master control.

Referring now to Figure 12, on the right hand in the figure, there is a master control unit comprising a master control lever $M^1$ which is operative for moving a double acting piston in a cylinder $M^2$. On the left hand in the figure, there is a so-called motor unit comprising a cylinder $S^1$ containing a double-acting piston to be moved in accordance with any movement imparted to the master control piston. The ends of the piston rod of the motor unit are seen in the figure, and such ends are operatively connected with any part to be operated or controlled by such motor unit. T indicates an armoured tubular casing enclosing twin pipes bound closely together along their length by heat insulating material. At its ends, the tubular casing T is fitted with Y-pieces $T^1$ and $T^2$. The ends of the twin tubes are separated and passed through respective branches of the Y-pieces. At the right-hand side of the figure, the end portions of the twin tubes passing through respective branches of the Y-piece $T^1$ are connected with respective ends of the master cylinder $M^2$ and at the lefthand side of the figure, the end portions of the twin tubes passing through respective branches of the Y-piece $T^2$ are connected with respective ends of the motor unit cylinder $S^1$. At a convenient intermediate point in its length, the tubular casing T is divided and the divided ends have connected with them Y-pieces $T^3$. Divided end portions of the twin tubes are passed through respective branches of the Y-pieces $T^3$ and are connected by the latter with a chest D. The latter normally provides a through-way connection between the branches $T^4$ of the Y-pieces $T^3$, which branches $T^4$ appertain to one of the twin tubes. The chest D also normally provides a through-way connection between the branches $T^5$ which appertain to the other one of the twin tubes. The two through-way connections in the chest are, of course, normally isolated from one another. The chest D further provides communication between one of the through-way connections and a compensator cylinder $C^1$, and between the other one of the through-way connections and a compensator cylinder $C^2$. Thus each of the twin tubes connects one end of the master cylinder $M^2$ with a corresponding end of the motor unit cylinder $S^1$ and, intermediately, is in communication with a compensator cylinder through the chest D. The compensator cylinders $C^1\ C^2$, which contain spring loaded pistons as hereinafter described, are supported in a body casting C and a box B supported on this casting encloses the eccentric mechanism of these improvements also as hereinafter described.

Figures 13, 14, 15:
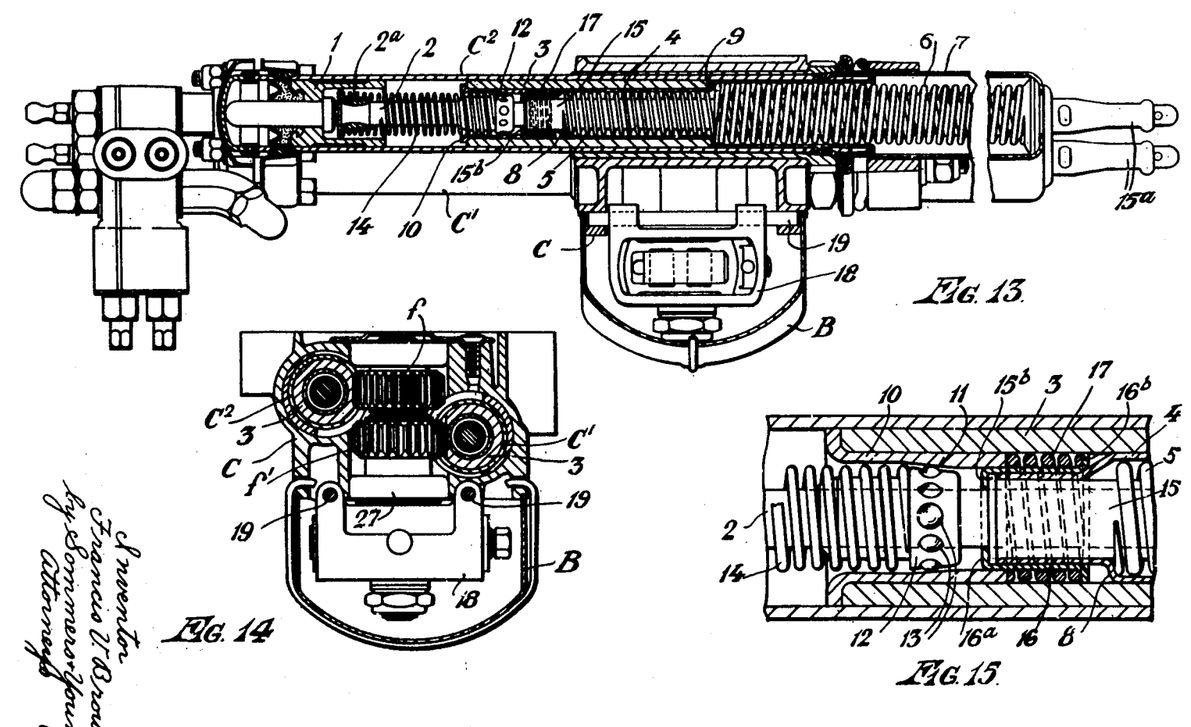
Figure 13 is a longitudinal sectional view of the compensating mechanism seen in Figure 12.
Figure 14 is a cross-section of Figure 13.
Figure 15 is a fragmental sectional view illustrating to a larger scale certain parts seen in Figure 13.

Referring to Figure 13, it will be seen that the compensator cylinder $C^2$ only is in section but it will be understood that the compensator cylinder $C^1$, seen only in elevation, is of precisely similar construction and has the same internal arrangements as the cylinder $C^2$. Each cylinder, has within it a piston 1 which is separate from its piston rod 2. Slidingly fitted within each cylinder is a hollow cylindrical part 3 (see also Figure 14) which is formed along its length with rack teeth for meshing with pinions $f\ f^1$ similar to those described with reference to Figures 3 and 4. As will be seen in Figure 14, the walls of the cylinders $C^1\ C^2$ are cut away to form openings in which the rack teeth are exposed so that they can freely mesh with respective pinions $f\ f^1$. Referring again to Figure 13, the right-hand end of the cylindrical rack 3 is abutted against an annular shoulder 9 of a tubular sheet-metal spring cup 4. The latter encloses a long loading spring 5 of small diameter and a shorter loading spring 6 of larger diameter and the annular shoulder 9 aforesaid occurs at the point where the larger diameter end portion of the cup 4, enclosing the spring 6 of larger diameter, merges into a portion of the cup which is of reduced diameter to suit the spring 5 and to fit within the rack 3. The springs 5 and 6 are compression springs and the spring 5 acts between an end cap 7, suitably fixed on the cylinder, and an annular shoulder 8 (Figure 15) formed by reducing the inner end of the cup 4, whilst the spring 6 acts between the said cap 7 and the shoulder 9 aforesaid. Thus, the two springs 5 and 6 constantly tend to force the cup 4 leftwardly and such force is transmitted to the cylindrical rack 3 by the annular shoulder 9. By using a suitable combination of springs of different lengths and diameters, it is possible to provide a spring loading of desirable rating. Within the left-hand end of the cylindrical rack 3 there is tightly inserted a thimble device 10 (Figures 13 and 15) the bore of the thimble being gradually reduced at an intermediate point so as to produce a tapered surface 11 (Figure 15). A ball cage 12 contains a set of balls 13 which operate as a ball clutch between the thimble and the piston rod 2. An auxiliary compression spring 14 operates between the ball cage 12 and a flanged fitting $2^a$ on the end of the piston rod 2. The piston 1 and piston rod 2 are shown in Figure 13 in an extreme leftward position, such as they would occupy when the system is not charged with liquid. It will be understood, however, that when the system is charged with liquid under pressure, such liquid entering at the end of the cylinders will force the pistons 1 and piston rods 2 rightwardly from the position illustrated, thereby putting the springs 5 and 6 under additional compression. When the system is charged with liquid under pressure and the pistons 1 in the two cylinders are forced rightwards from the position seen in Figure 13, if a rise of temperature should cause expansion of the liquid in the system, the two pistons 1 will be forced farther to the right against the resistance of the springs 5 and 6. If contraction of the liquid in the system should occur, due to a fall in temperature, then the two pistons 1 will move leftwardly under the urge of the springs 5 and 6. In view of the fact that the twin tubes connecting the master control with the motor unit are closely juxtaposed along their length within a common casing T, as explained with reference to Figure 12, the expansion or contraction in one will always be reasonably equal to that in the other, so that the two pistons 1 will always be equally affected. In the event of a slight leakage from one of the tubes, so that liquid recedes from a piston 1, the latter is caused to follow up and maintain pressure contact with the liquid by the action of the auxiliary spring 14.

The latter operates in compression between the ball cage 12 and the flanged fitting 2ª. It will be observed that due to the one-way action of the ball clutch 13, the rod 2 is free to move leftwardly relatively to the cylindrical rack 3, the balls declutchingly rolling along the taper 11 towards the enlarged bore of the thimble 10. Opposite movement of the rod 2, that is to say rightwardly relatively to the cylindrical rack 3, is not possible because the balls 13 are then jammed between the rod 2 and the contracting bore of the tapered part 11. Each piston 1 is consequently always maintained in full pressure contact with the liquid within its cylinder and cannot move back from the position in which it makes such contact. When the liquid charge in a system is to be replenished, the pistons must be permitted to move back to a normal position under the pressure of the liquid. For this purpose a so-called lifter tube 15 is provided. As will be clear from Figure 15, the lifter tube 15 is sleeved along the rod 2 and both it and the rod 2 extend through the cap 7, Figure 13, the end 15ª of the tube being fashioned so that it can be grasped between finger and thumb. The inner end of the tube is flanged at 15ᵇ this flange being engaged with an inturned flange 16ª on one end of a short cylindrical sleeve 16 slidable on the inner end portion of the spring cup 4. The other end of the sleeve 16 has an out-turned flange 16ᵇ which forms an abutment for one end of a small compression spring 17, the opposite end of the latter being abutted against the end of the thimble 10. It will now be seen that the lifter tube 15 can be pushed to the left, against the action of the spring 17, so as to engage the ball cage 12 and move the balls 13 into de-clutching position. This permits the piston 1 to be moved inwardly by the liquid pressure and the rod 2 to move rightwardly in relation to the cylindrical rack 3. When this operation is finished and finger pressure is released from the part 15ª, the spring 17 ensures the return of the lifter tube 15 to its normally inoperative position.

It will be apparent that when the master control handle M¹, Figure 12, is operated, one side of the piston in the cylinder M² forces liquid through one of the tubes to one side of the motor piston in the unit S¹, liquid displaced by the other side of the motor piston being returned through the other tube to the other side of the master piston. During such an operation the pressure in one of the tubes and in one of the cylinders C¹ C² is greater than that in the other. Consequently, the piston 1, Figure 13, subjected to the greater pressure would move rightwardly in its cylinder and prevent the motor piston from being properly operated, if it were not for the action of the mechanical linkage of these improvements now to be described. This linkage, as will be seen, is effective for permitting simultaneous equal movements in one and the same direction and for preventing movement of one piston relatively to the other when the master control is operated.

Figure 20:
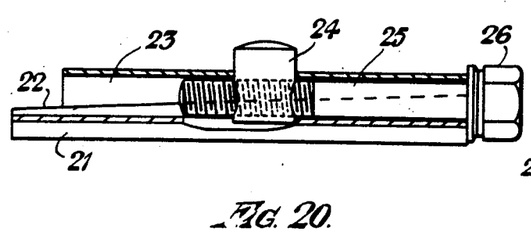
Figure 20 is a sectional elevation to a larger scale of a wedge adjuster employed in the mechanism illustrated in Figures 16 and 18.
Figure 21:
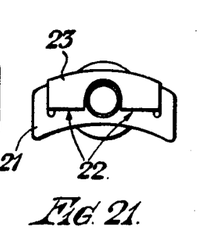
Figure 21 is an elevation as seen from the left hand side of Figure 20.

The mechanical linkage, which is an eccentric mechanism generally similar to that described with reference to Figures 3 to 11, is contained in a housing 18 which is detachably mounted on the body C by means of two parallel pins 19, Figures 13 and 14. The details of this eccentric mechanism are illustrated clearly in Figures 16 to 21. As in the preceding construction, the pinion $f$ is fixedly mounted on one end of a central shaft $h$ which has fixedly mounted at its other end an eccentric $j$. The pinion $f^1$ is fixedly mounted on one end of a hollow shaft $h^1$ revolubly sleeved on to the shaft $h$, the other end of the shaft $h^1$ having fixedly mounted on it an eccentric $j^1$. The eccentrics $j$ $j^1$ work in holes in respective slides $l$ $l^1$, a ball bearing $m$ which may be initially stressed being interposed between each eccentric and its slider. The sliders $l$ $l^1$ are guided rectilinearly in the housing 18 by means of a brass or other bearing strip 20, Figure 18, at one side and by means of an adjustable bearing strip or pad 21, Figures 18, 20 and 21, at the other side. The adjustment of the bearing strip or pad 21 will be clearly understood from Figures 20 and 21, wherein it will be seen that at the rear the strip or pad 21 is formed with inclined surfaces 22 which slidably engage similarly inclined surfaces of a wedge member or gib 23. A pin 24 passed through a hole in the gib 23 is formed with a diametrical screw-threaded hole to serve as a nut for an adjusting bolt 25, the head 26 of which bears against the bearing pad 21. The end of the pin 24 projecting beyond the gib 23 is engaged in a hole in a wall of the housing 18, Figures 16 to 18, so that the gib 23 cannot move longitudinally. It will be seen, therefore, that by turning the bolt 25 by means of a key or wrench applied to the head 26, the said bolt will screw itself through the nut and force the bearing pad 21 to slide longitudinally along the gib 23. Owing to the wedging action produced by the inclined surfaces 22, the bearing pad 21 is thus tightened against the sliders $l$ $l^1$, so that the latter are slidable in the closest possible contact relation with the bearing strip 20 and bearing pad 21. Absence of slackness and the maintenance of substantial tightness at these bearing faces is important for the accurate working of the eccentric mechanism.

Figure 16:
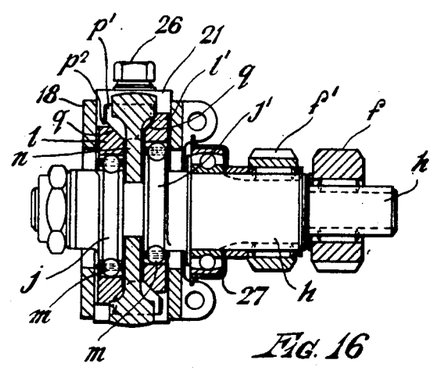
Figure 16 is a sectional elevation of the eccentric mechanism embodied in the compensating mechanism illustrated in Figures 13 and 14.
Figure 17:
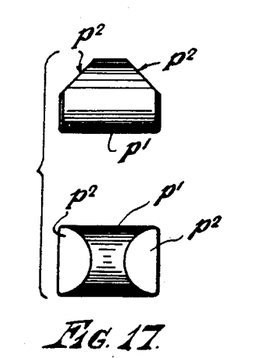
Figure 17 comprises both a side elevation and a plan to a larger scale of one of the locking pins seen in Figure 16.
Figure 18:
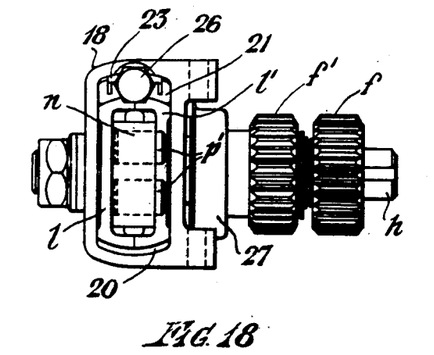
Figure 18 is a plan of Figure 16.
Figure 19:
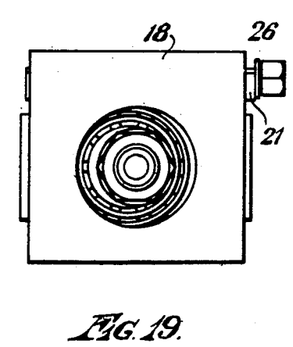
Figure 19 is an elevation as seen from the left hand side of Figure 18.

The automatic locking device in Figures 16 and 18 comprises a plate $n$ similar to that described with reference to Figures 6 to 9, but whereas in the latter figures the plate was fitted with pins $p$ having rounded ends for engaging with the bevelled surfaces $q$ of the sliders $l$ $l^1$, in Figures 16 to 18 pins $p^1$ have end portions removed to provide flat surfaces $p^2$ for engaging with the bevelled surfaces $q$. The reason for this is to avoid wear and prevent indentation of the bevelled surfaces $q$ by the pressure of the ends of the pins against them. A ball bearing 27 provided on the shaft $h^1$, Figures 16 and 18, is inserted into and supported by the body C when the parts are mounted in position as in Figure 14.

As already explained with reference to Figure 13, the pistons in the two cylinders C C¹ can simultaneously move inwardly in their cylinders under the effect of pressure due to expansion of liquid in the system and against the resistance of the loading springs 5 and 6. Or, they can simultaneously move outwardly under the urge of the loading springs 5 and 6 when contraction of the liquid in the system takes place. When these simultaneous and like movements of the pistons take place the pinions $f$ $f^1$, Figures 14, 16 and 18 are turned by the racks 3 and the eccentrics $j$ $j^1$ are turned equally and oppositely in their respective sliders $l$ $l^1$. This produces sliding movements of the sliders $l$ $l^1$ in opposite directions and, as in Figures 6 to 9, such opposite movements of the sliders $l$ $l^1$ produce transverse movement of the pins $p^1$ by reason of the camming action of some of the bevelled surfaces $q$ against the bevelled surfaces $p^2$ of the pins $p^1$. When the master control handle M¹, Figure 12, is operated in one direction or the other to produce similar operation of the motor unit S¹, this will set up a greater pressure in one of the twin tubes of the transmission, because that tube is transmitting the power for overcoming whatever load there may be on the motor unit whereas the other tube is merely returning to the master control cylinder the liquid displaced from one end of the motor unit cylinder. Consequently, the piston I in one of the cylinders C, C¹ will be subjected to a greater pressure than the piston in the other cylinder. If the eccentric mechanism of these improvements were not present, the piston I, subjected to the greater pressure might move inwardly against its spring loading with the result that the motor unit would not be operated or not accurately operated. With the eccentric mechanism mounted and operative as hereinbefore described, the instant that there is a tendency to move one piston not simultaneously with and in the same direction and to the same extent as the other piston, the corresponding eccentric $j$ or $j^1$, Figure 16, will tend to turn alone. In order to be able to turn, however, this eccentric must be able to move its slider $l$ or $l^1$ but this is impossible for, owing to the locking pins $p^1$, the one slider can only move if at the same time the other slider moves oppositely to permit the pins $p^1$ to be cammed transversely of the sliders as already explained. Consequently, the eccentric mechanism is jammed and positively prevents any such individual movement of one of the pistons I. This jamming effect will be obtained even when the eccentrics $j$ $j^1$ have arrived at the point where their eccentric radii coincide, for at all times it is necessary, if free movement is to take place, that the one eccentric should move equally and oppositely to the other.

I claim:

1. In a remote control system having a transmitting medium in which variations occur from expansions and contractions thereof, mechanical linkage for compensating said variations comprising a rectilineal guide, eccentrics oppositely revoluble about a common axis during compensating movements, and strap devices formed as sliders encircling said eccentrics and slidable in said guide, said eccentrics being normally free to adjust themselves by simultaneous turning movement under the influence of said variations but constituting together with the said strap devices and rectilineal guide a locked mechanism when the transmission is operatively stressed.

2. In a remote control system having a transmission means, two spring loaded sliding members in operative connection with said transmission means and gearing between the said members, said gearing comprising a rectilineal guide, eccentrics oppositely revoluble about a common axis during compensating movements by said members, and strap devices formed as sliders encircling said eccentrics and slidable in said guide, whereby said gearing permits simultaneous movement of the spring loaded sliding members in one and the same direction under the influence of variations due to expansion and contraction of the transmission means and acts as an interlock between the said members when the transmission is operatively stressed.

3. In a remote control system of the closed circuit type comprising outward and return transmission leads from and to the master control, the combination of spring loaded sliding members in connection with respective leads, rack and pinion gears in driving connection with respective members, eccentrics in driving connection with respective gears and simultaneously but oppositely revoluble about a common axis during compensating movements by said members, a rectilineal guide, and strap devices formed as sliders encircling said eccentrics and slidable in said guide.

4. In a remote control system of the closed circuit type comprising a master control including a handle, and outward and return transmission leads from and to the master control, the combination of spring loaded sliding members in connection with respective leads, rack and pinion gearing in driving connection between said master control handle and said members, eccentrics in driving connection with respective gears and simultaneously but oppositely revoluble about a common axis during compensating movements by said members, a rectilineal guide rockable by said handle, and strap devices formed as sliders encircling said eccentrics and slidable in said guide.

5. In a remote control system of the closed circuit type comprising outward and return transmission leads from and to the master control, the combination of spring loaded sliding members in connection with respective leads, rack and pinion gears in driving connection with respective members, eccentrics in driving connection with respective gears and simultaneously but oppositely revoluble about a common axis during compensating movements by said members, a rectilineal guide, strap devices formed as sliders encircling said eccentrics and slidable in said guide, and anti-friction rolling bodies interposed between said sliders and said eccentrics.

6. In a remote control system of the closed circuit type comprising outward and return transmission leads from and to the master control, the combination of spring loaded sliding members in connection with respective leads, rack and pinion gears in driving connection with respective members, eccentrics in driving connection with respective gears and simultaneously but oppositely revoluble about a common axis during compensating movements by said members, a rectilineal guide, strap devices formed as sliders encircling said eccentrics and slidable in said guide, and anti-friction rolling bodies interposed between said sliders and said eccentrics in such manner that said rolling bodies are under initial stress when the parts are assembled.

7. In a remote control system having a transmission means, two spring loaded sliding members in operative connection with said transmission means and gearing between the said members, said gearing comprising a rectilineal guide, eccentrics oppositely and simultaneously revoluble about a common axis during compensating movements by said members, strap devices formed as sliders encircling said eccentrics and slidable in said guide, a carrier revoluble about said axis, and locking means movably supported in said carrier and interengaging with said strap devices in such manner as to permit said strap devices to perform simultaneous sliding movements in opposite directions but to prevent them from performing simultaneous sliding movements in one and the same direction.

8. In a remote control system having a transmission means, two spring loaded sliding members in operative connection with said transmission means and gearing between the said members, said gearing comprising a rectilineal guide, eccentrics oppositely and simultaneously revoluble about a common axis during compensating movements by said members, strap devices formed as sliders encircling said eccentrics and slidable in said guide, a carrier plate disposed between said eccentrics and revoluble about said axis, and pin devices slidable laterally through said carrier plate and having camming engagement with the ends of said strap devices whereby the latter are permitted to perform simultaneous sliding movements in opposite directions but are prevented from performing simultaneous sliding movements in one and the same direction.

9. In a remote control system of the closed circuit type comprising outward and return transmission leads from and to the master control, the combination of spring loaded sliding members in connection with respective leads, rack and pinion gears in driving connection with respective members, eccentrics in driving connection with respective gears and simultaneously but oppositely revoluble about a common axis during compensating movements by said members, a rectilineal guide, strap devices formed as sliders encircling said eccentrics and slidable in said guide, and an adjustable bearing pad interposed between one of said sliders and said guide and operative for tightening said sliders in said guide.

10. A compensator for a remote control system of the closed circuit type comprising two spring loaded sliding members in connection with respective circuit leads, rack and pinion gearings in driving connection with respective members, two eccentrics each in driving connection with a respective gearing and simultaneously but oppositely revoluble about a common axis during compensating movements by said members, strap devices formed as sliders encircling said eccentrics, a fixedly mounted rectilineal guide for said strap devices to slide in, and locking means operating reciprocally between said strap devices for permitting simultaneous sliding movements thereof in opposite directions but preventing such movements in one and the same direction.

FRANCIS VICTOR BROWN.